March 21, 1961 — A. MILLER — 2,976,462
PROTECTIVE SYSTEM
Filed Nov. 13, 1956
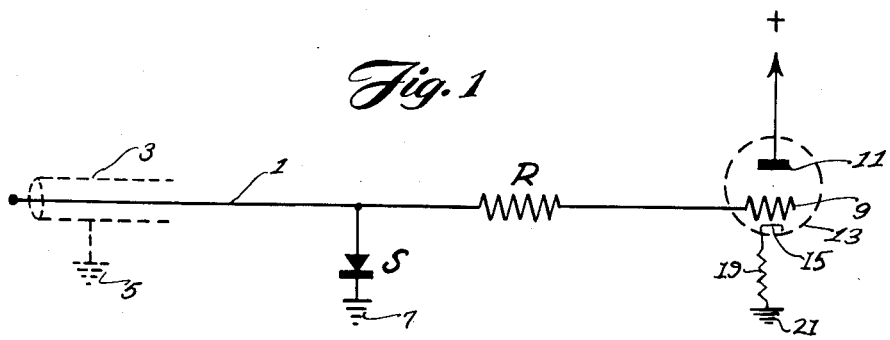
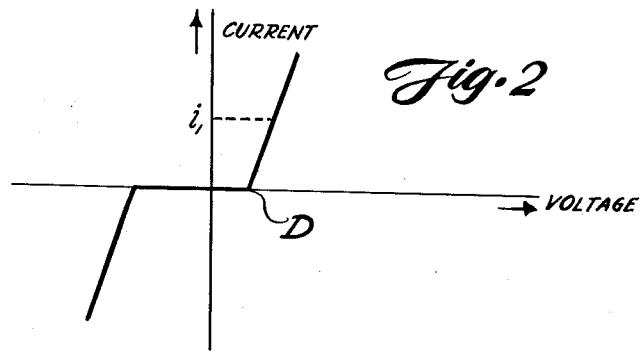
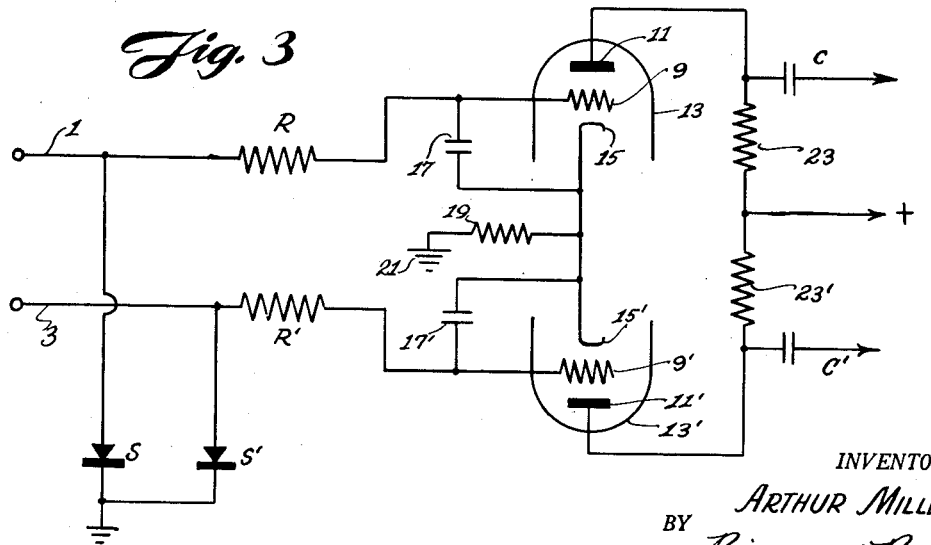
INVENTOR.
ARTHUR MILLER
BY Rines and Rines
ATTORNEYS

United States Patent Office 2,976,462
Patented Mar. 21, 1961

2,976,462
PROTECTIVE SYSTEM

Arthur Miller, Brookline, Mass., assignor to Sanborn Company, Cambridge, Mass., a corporation of Massachusetts Filed Nov. 13, 1956, Ser. No. 621,596

10 Claims. (Cl. 317—9)

The present invention relates to protective systems and, more particularly, to electric circuits adapted to protect signal-carrying conductors and the like from the consequences of their accidental assumption of dangerous potentials.

There are numerous cases where the accidental development of dangerous voltages or charges upon signal-carrying conductors constitutes a hazardous condition. Such a condition may arise, for example, in the utilization of operating-room equipment in atmospheres containing explodable gases, such as anesthetic ethyl ether and the like. Numerous proposals have been offered for eliminating the possibility of accidentally produced sparks, including attempts to provide electrostatic shielding and to use particular non-static materials. When, however, electronic or electrical apparatus such as, for example, an electrocardiographic equipment or oscilloscopic recorder and the like is to be employed in the operating room, many different kinds of failures of the equipment can occur which may constitute a serious hazard to life and limb. It is well known that the heavy anesthetic gases tend to accumulate at the lower levels or regions of the room. The use of electrical or electronic equipment has therefore been restricted to areas disposed well above such low regions, namely, to locations at least five feet above the floor of the operating room unless the equipment itself is placed in an explosion-proof housing. Even so, it is necessary in electrocardiographic or similar recording operations, before-referred to, to carry one or more signal conductors or cables from the vicinity of the patient up to the elevated or explosion-proofed electrical or electronic apparatus. Signal conductors or cables thus extend into the very region where explosive gases are present. Signal voltages generated by cardiac acivity and the like at the patient's end of the cable or conductor and transmitted along the cable or conductor to the input of the electrical or electronic apparatus are usually far too small to permit the development of any dangerous potential or charge that might break down the gas. Failure in the electrical or electronic apparatus itself, however, may result in the placing of dangerously high potentials or charges upon the signal-voltage conductors and cables. Such signal-voltage conductors or cables act as capacitive voltage or charge-storing devices which, upon certain types of breakdown in the electrical or electronic apparatus, may accumulate potentials sufficient to initiate a discharge that may ignite the explodable gases.

There are, of course, many other conditions than those above-described in which it is desirable and even essential that conductors be not permitted to assume dangerous potentials or charges. For purposes of illustration, however, the invention will be hereinafter described in connection with the important operating-room problem above-referred to, though it is to be understood that the invention is of much broader applicability, being useful wherever it is desired to protect against the development of dangerous voltages.

An object of the present invention, accordingly, is to provide a new and improved electric system that obviates the above-described difficulties and protects against the circumstance of dangerous potential or charge development in conductors and cables and the like through failure, breakdown or misadjustment of electrical or electronic apparatus associated with the conductors or cables.

In summary, these ends are attained through placing an appropriate impedance in series with the conductor or conductors along which the signal voltages are to be transmitted and that, through failure and the like in the associated apparatus, may assume the dangerous potential. A threshold-voltage-operated switching device is connected in shunt. Through appropriate design of the value of the series impedance, considered in the light of the threshold voltage and other features of the voltage-current characteristics of the switching device, the conductor or conductors may be effectively prevented from assuming dangerous potentials or charges even in the event of electrical failures and the like in the associated electrical system or apparatus. Details are hereinafter set forth.

Other and further objects will be explained hereinafter and will be more particularly pointed out in the appended claims.

The invention will now be described in connection with the accompanying drawing Fig. 1 of which is a schematic circuit diagram illustrating the invention in simplified form;

Fig. 2 is a graph of the performance of the switching device of Fig. 1; and

Fig. 3 is a circuit diagram of a preferred modification.

In order to illustrate from a very general point of view the wide applicability of the invention for use with any type of electrical or electronic system, the particulars of the electronic or electrical apparatus to be associated with the input or other conductors or cables of the present invention are omitted from the drawings, sufficient details being shown only to indicate one illustrative generalized type of apparatus with which the invention may be used. That type is shown in Fig. 1 as comprising an input amplifier 13, such as, for example, an electron-tube amplifier, having a control-grid electrode 9, a cathode 15 shown connected through a resistor 19 to a ground terminal 21, and a plate or anode 11, diagrammatically shown connected to a source of anode potential indicated by the symbol +. The input to the amplifier 13, of course, comprises the control-grid electrode 9 and the cathode 15 between which signal voltages are fed by a conductor or cable 1, 3, as of the single-ended coaxial-line type having an outer coaxial shield 3, shown grounded at 5. The inner signal-voltage-carrying conductor 1 is connected to the control-grid electrode 9. Signal voltages may thus be applied to the conductors 1, 3 at the left-hand end thereof and may be transmitted along the conductors or cable 1 and 3 to the input terminals of the amplifier 13. In the before-mentioned illustration, the amplifier 13 might comprise a first stage of an electrocardiographic ocsilloscope recorder mounted above the operating-room floor, and the left-hand end of the conductors 1, 3 may be connected to electrodes, not shown, associated with a patient or other source of signal voltage remote from the recorder.

In an anode-to-control electrode short circuit should occur as result of failure in the tube 13, as an illustration, the high anode potential + may be applied to the control electrode 9 and thus may charge the effective capacity of the length of cable 1, 3 to a potential sufficient to produce breakdown in an explodable anestheticgas mixture in the vicinity of the patient. This is prevented, in accordance with the present invention, through the utilization of an appropriate impedance R, preferably a resistor, connected in series with the conductor 1, preferably as close to the possible source of high voltage 13 as is possible, for reasons later explained. A threshold-voltage-operated switching device, illustrated as a diode S, is connected in shunt between the left-hand terminal of the series resistance R and the ground terminal 7. The preferred form of the switching device S is a silicon or similar diode having a non-linear characteristic corresponding to that illustrated in Fig. 2. The current passing through diode S is plotted along the ordinate and the voltage developed across the diode is plotted along the abscissa. It will be observed that, considering the portion of the graph of Fig. 2 to the right of the ordinate, the application of low voltages, such as signal voltages, to the diode S will not permit the diode to conduct until a threshold voltage D is reached. At this point D, the voltage-current characteristic exhibits a discontinuity and the diode S rapidly starts to conduct as indicated by the steeply rising right-hand leg of the graph. A similar but reverse characteristic is indicated for voltages of opposite polarity, plotted to the left of the ordinate. It will be observed that the discontinuity D takes place for voltages that, in accordance with the present invention, are far in excess of any possible signal voltages developed along the conductors 1, 3. The diode S, therefore, normally remains non-conductive and of very high impedance, thus exercising no influence whatsoever upon the transmission of those signal voltages from the left-hand end of the cable or conductors 1, 3 to the input of the amplifier system 13. When, however, a spurious condition arises, such as the anode-to-control electrode short circuit before mentioned, high potential may be applied to the control electrode 9 and the conductor 1, causing the threshold voltage D to be exceeded. The diode S then rapidly conducts, presenting a low-impedance path to ground and thus by-passing the high voltage from the left-hand portion of the cable 1, 3. The reason for locating the series impedance R and the shunt diode D as close to the equipment as possible, as before mentioned, resides in the fact that dangerous voltage can then be suppressed right up to regions of the conductor or cable adjacent the electrical apparatus 13 itself. Other types of non-linear switching devices having similar voltage-current discontinuity characteristics may, of course, be employed as is well known, but the diode is preferred for purposes of simplicity and reliability.

In accordance with the invention, however, as contrasted with mere signal-clamping circuits as employed in other kinds of electronic circuits, it is important that the diode circuit be operated with certain definite relationships between the impedance R and the characteristics of the diode S. If the high voltage developed by failure or spurious operation of the amplifier 13 were to burn out or damage the rectifier S, all protection would be lost. For the purpose of the present invention, therefore, the value of the resistor R must be adjusted to a value sufficient to limit any possible current flowing in the diode S to a safe predetermined value that will not permit damage to the diode S. If, as shown in Fig. 2, the current $i_1$ represents the safe current for the diode S, then the value of the resistor R must be such that, irrespective of the magnitude of the high voltage that may be applied to the conductor 1, the current through the diode S is limited to the value $i_1$.

Expressed mathematically, if the resistor R be more generally designated as an impedance $Z_1$, the impedance of the non-linear shunt-switching device S be represented as $Z_2$, and the possible maximum danger voltage that could be developed be represented by $E_1$, then the approximate current that would be driven through the impedances $Z_1$ and $Z_2$ in the presence of the danger voltage is given by the ratio $E_1/Z_1$. The value of $Z_1$ is so chosen that the ratio $E_1/Z_1$ is small enouugh to be safe for the device S to handle. Preferably, $Z_1$ is only large enough to permit the current through the diode S to exceed the current $i_2$ produced near or just above the threshold-voltage discontinuity D. This relationship may be expressed as:

$$i_1 > \frac{E_1}{Z_1} > i_2$$

While adjustment of R (or $Z_1$) to a value sufficient to limit the current that may pass through the switching device S to the predetermined safe value $i_1$ is, of course, of primary importance, it is desirable simultaneously to employ the lowest possible value of R so as to minimize loss in the transmission of the low-level signal voltages to the amplifier 13. This end is achieved through selecting a value of R that is sufficient to maintain the current passed through the switching device S to a value above, but near the current $i_2$ produced at the threshold voltage D. Under such circumstances, the signal-voltage conductors 1, 3 are rendered completely safe and incapable of developing potentials or charges that would be dangerous consistent with permitting substantially unimpeded signal-voltage transmission therealong.

In electrocardiographic oscilloscope recorders and the like, moreover, it is frequently desirable to employ push-pull circuits. In the embodiment of Fig. 3, therefore, the input cable or conductors 1, 3 are shown as a pair of push-pull conductors 1 and 3, respectively connected between the control electrodes 9 and 9' of a pair of push-pull connected amplifiers 13 and 13'. The anodes 11 and 11' of the amplifiers 13 and 13' are shown connected through plate loads 23 and 23' to the anode potential source +, and the outputs of the amplifiers are shown coupled by capacitors C and C' to the next stage, not shown. The cathodes 15 and 15' are connected through a common load 19 to the ground terminal 21 and input-circuit capacitors 17 and 17' are shown connected between the control electrodes 9 and 9' and the respective cathodes 15 and 15'. The input conductors 1 and 3 are provided with similar series impedances, such as the resistors R and R', corresponding to the impedance R of Fig. 1, and similar shunt-connected switching devices S and S', corresponding to the diode S of Fig. 1.

As an illustration of typical operating components and values, the switching device S may be a silicon diode of the 1N468-type having a voltage-current characteristic similar to that illustrated in Fig. 2 and in which the threshold voltage D is about six tenths of a volt and the threshold voltage in the opposite direction, indicated by the downwardly-sloping leg of the graph, is about 5 volts. The plate or anode voltage + in the equipment may be of the order of, for example, 500 volts. Under such circumstances, the resistor R may have a value of about one-quarter of a megohm, in which event current is limited through the diode S to a value of the order of 2 milliamperes.

Further modifications will occur to those skilled in the art and all such are considered to fall within the spirit and scope of the invention as defined in the appended claims.

What is claimed is:

1. In an electric system in which signal voltages developed with respect to a reference terminal are to be transmitted along a conductor that, through failure and the like in the system, may assume a dangerous potential, the combination of an impedance connected in series with the conductor and a threshold-voltage-operated switching device connected in shunt between the conductor and the reference terminal, the switching device having a voltage-current characteristic provided with a discontinuity at a threshold voltage in excess of the signal voltages at which the device changes from a high to a low impedance and being adapted to pass currents up to a predetermined value without damage to the device, and the value of the series impedance being adjusted to limit the current that may pass through the switching device to values not exceeding the said predetermined value.

2. In an electric system in which signal voltages developed with respect to a reference terminal are to be transmitted along a conductor that, through failure and the like in the system, may assume a dangerous potential, the combination of an impedance connected in series with the conductor and a threshold-voltage-operated switching device connected in shunt between the conductor and the reference terminal, the switching device having a voltage-current characteristic provided with a discontinuity at a threshold voltage in excess of the signal voltages at which the device changes from a high to a low impedance and being adapted to pass currents up to a predetermined value without damage to the device, and the value of the series impedance being adjusted not only to limit the current that may pass through the switching device to values not exceeding the said predetermined value but, also, to maintain the said current at a value near but above the current produced at the thresold voltage at the said discontinuity in the voltage-current characteristic.

3. In an electric system in which signal voltages developed with respect to a reference terminal are to be transmitted along a conductor that, through failure and the like in the system, may assume a dangerous potential, the combination of a resistance connected in series with the conductor and a threshold-voltage-operated switching device connected in shunt between the conductor and the reference terminal, the switching device having a voltage-current characteristic provided with a discontinuity at a threshold voltage in excess of the signal voltages at which the device changes from a high to a low resistance and being adapted to pass currents up to a predetermined value without damage to the device, and the value of the series resistance being adjusted not only to limit the current that may pass through the switching device to values not exceeding the said predetermined value but, also, to maintain the said current at a value near but above the current produced at the threshold voltage at the said discontinuity in the voltage-current characteristic.

4. In an electric system in which signal voltages developed with respect to a reference terminal are to be transmitted along a conductor that, through failure and the like in the system, may assume a dangerous potential, the combination of an impedance connected in series with the conductor and a threshold-voltage-operated diode device connected in shunt between the conductor and the reference terminal, the diode device having a voltage-current characteristic provided with a discontinuity at a threshold voltage in excess of the signal voltages at which the device changes from a high to a low impedance and being adapted to pass currents up to a predetermined value without damage to the device, and the value of the series impedance being adjusted not only to limit the current that may pass through the diode device to values not exceeding the said predetermined value, but, also, to maintain the said current at a value near but above the current produced at the threshold voltage at the said discontinuity in the voltage-current characteristic.

5. In a push-pull system in which signal voltages developed with respect to a reference terminal are to be transmitted along a pair of conductors that, through failure and the like in the system, may assume a dangerous potential, the combination of a pair of similar impedances, one connected in series with each of the conductors, and a pair of similar threshold-voltage-operated switching devices, one connected in shunt between each of the conductors and the reference terminal, each switching device having a voltage-current characteristic provided with a discontinuity at a threshold voltage in excess of the signal voltages at which the device changes from a high to a low impedance and being adapted to pass currents up to a predetermined value without damage to the device, and the value of each series impedance being adjusted to limit the current that may pass through the corresponding switching device to values not exceeding the said predetermined value.

6. In an electric system for use in operating rooms and the like where explodable gas is present and in which signal voltages developed with respect to a reference terminal are to be transmitted along a conductor that, through failure and the like in the system, may assume a potential sufficient to effect explosion of the gas, the combination of an impedance connected in series with the conductor and a threshold-voltage-operated switching device connected in shunt between the conductor and the reference terminal, the switching device having a voltage-current characteristic provided with a discontinuity at a threshold voltage of the order of several hundred millivolts that is in excess of millivolt signal voltages at which the device changes from a high to a low impedance and being adapted to pass currents up to a predetermined value without damage to the device, and the value of the series impedance being adjusted not only to limit the current that may pass through the switching device to values not exceeding the said predetermined value but, also, to maintain the said current at a value near but above the current produced at the threshold voltage at the said discontinuity in the voltage-current characteristic.

7. An electric system having, in combination, an amplifier provided with input terminals, first and second conductors connected to the input terminals from a source of signal voltages, an impedance connected in series with the first conductor near the said input terminals, and a threshold-voltage-operated switching device connected in shunt between the first and second conductors, the switching device having a voltage-current characteristic provided with a discontinuity at a threshold voltage in excess of the signal voltages at which the device changes from a high to a low impedance and being adapted to pass currents up to a predetermined value without damage to the device, and the value of the series impedance being adjusted to limit the current that may pass through the switching device to values not exceeding the said predetermined value.

8. An electric system having, in combination, an amplifier provided with input terminals, first and second conductors connected to the input terminals from a source of signal voltages, an impedance connected in series with the first conductor near the said input terminals, and a threshold-voltage-operated switching device connected in shunt between the first and second conductors, the switching device having a voltage-current characteristic provided with a discontinuity at a threshold voltage in excess of the signal voltages at which the device changes from a high to a low impedance and being adapted to pass currents up to a predetermined value without damage to the device, and the value of the series impedance being adjusted not only to limit the current that may pass through the switching device to values not exceeding the said predetermined value but, also, to maintain the said current at a value near but above the current produced at the threshold voltage at the said discontinuity in the voltage-current characteristic.

9. An electric system having, in combination, a pair of push-pull-connected amplifiers each provided with input terminals, a pair of conductors, one connected to one of each of the input terminals from a source of signal voltages, the other input terminal of each amplifier being connected to a reference terminal, a pair of similar impedances, one connected in series with each of the conductors near the corresponding input terminals, and a pair of similar threshold-voltage-operated switching devices, one connected in shunt between each of the conductors and the reference terminal, each switching device having a voltage-current characteristic provided with a discontinuity at a threshold voltage in excess of the signal voltages at which the device changes from a high to a low impedance and being adapted to pass currents up to a predetermined value without damage to the device, and the value of each series impedance being adjusted to limit the current that may pass through the corresponding switching device to values not exceeding the said predetermined value.

10. An electric system having, in combination, a pair of push-pull-connected amplifiers each provided with input terminals, a pair of conductors, one connected to one of each of the input terminals from a source of signal voltages, the other input terminal of each amplifier being connected to a reference terminal, a pair of similar impedances, one connected in series with each of the conductors near the corresponding input terminals, and a pair of similar threshold-voltage-operated switching devices, one connected in shunt between each of the conductors and the reference terminal, each switching device having a voltage-current characteristic provided with a discontinuity at a threshold voltage in excess of the signal voltages at which the device changes from a high to a low impedance and being adapted to pass currents up to a predetermined value without damage to the device, and the value of each series impedance being adjusted not only to limit the current that may pass through the corresponding switching device to values not exceeding the said predetermined value but, also, to maintain the said current at a value near but above the current produced at the threshold voltage at the said discontinuity in the voltage-current characteristic.

References Cited in the file of this patent

UNITED STATES PATENTS

| | | |
|---|---|---|
| 2,431,151 | Tellegen | Nov. 18, 1947 |
| 2,789,254 | Bodle | Apr. 16, 1957 |
| 2,846,526 | Moore | Aug. 5, 1958 |
| 2,854,615 | Light | Sept. 30, 1958 |

FOREIGN PATENTS

| | | |
|---|---|---|
| 861,889 | France | Feb. 19, 1941 |